United States Patent [19]

Peters

[11] 4,255,319

[45] Mar. 10, 1981

[54] POLYMERIC COMPOSITIONS CONTAINING ELEMENTAL RED PHOSPHORUS, ALDEHYDES OR KETONES OR MIXTURES THEREOF

[75] Inventor: Edward N. Peters, Piscataway, N.J.

[73] Assignee: Union Carbide Corporation, New York, N.Y.

[21] Appl. No.: 969,877

[22] Filed: Dec. 15, 1978

[51] Int. Cl.$^3$ .............................................. C08K 3/32
[52] U.S. Cl. ............................ 260/45.7 P; 106/18.18; 106/177; 252/8.1; 260/45.7 R; 260/45.9 P; 260/DIG. 24
[58] Field of Search .................... 260/45.7 R, 45.7 P, 260/45.9 P, DIG. 24; 106/18.18; 252/8.1; 423/322

[56] References Cited

U.S. PATENT DOCUMENTS

| | | | |
|---|---|---|---|
| 3,644,595 | 2/1972 | Wu | 260/920 |
| 3,808,127 | 4/1974 | Sander et al. | 252/8.1 |
| 3,951,908 | 4/1976 | Kaiser et al. | 260/45.7 P |

OTHER PUBLICATIONS

R. Zabradvik, Chem. Abstracts, vol. 56, (5995).
L. J. Vrbanek, Bensene Derivatives, 5402, p. 1961.
Organo Metallic Compounds, (1962), 5994.
Fluck and Novobilsky, Die Chemie des Phosphins, pp. 147-150.
Messinger et al., Ber. Devt. Chem. Ge., 21, 2919, (1888).

Primary Examiner—Donald E. Czaja
Assistant Examiner—W. Thompson
Attorney, Agent, or Firm—Clement J. Vicari

[57] ABSTRACT

A polymeric composition comprising a thermoplastic or thermoset polymer, elemental red phosphorus and an aldehyde or $\beta$-carbonyl-containing ketone, or mixtures thereof.

8 Claims, No Drawings

POLYMERIC COMPOSITIONS CONTAINING ELEMENTAL RED PHOSPHORUS, ALDEHYDES OR KETONES OR MIXTURES THEREOF

BACKGROUND OF THE INVENTION

1. Field of the Invention

This invention relates to a polymeric composition comprising a thermoplastic or thermoset polymer, elemental red phosphorus, and an aldehyde or $\beta$-carbonyl-containing ketone, or mixtures thereof.

2. Description of the Prior Art

Elemental phosphorus, particularly red phosphorus, has been described as an additive in a number of polymeric systems. The amorphous elemental red phosphorus, either alone or in combination with other additives, has been described as an effective flame retardant additive in polymeric systems. Red phosphorus has been added to, for example, polyurethanes, polyamides, polyformaldehydes, polyepoxides, polyethylene terephthalate, epoxy resins, styrene/acrylonitrile copolymers, rubber blends, polyvinyl chloride, polyoxymethylenes, polycarbonates, blends of polyphenylene ether and styrene resins, and olefin polymers as well as various thermoset polymers.

However, on exposure to air at normal temperatures and humidities, red phosphorus reacts with the water vapor and oxygen to form phosphine. Also, during the storage and handling of red phosphorus and additionally, at the elevated temperatures used in processing thermoplastics and curing thermosetting materials, phosphine is formed. Phosphine is a highly toxic gas. Thus it is highly desirable to eliminate formation of phosphine when using the phosphorus. This can be accomplished by the inclusion of a substance which binds the phosphine.

U.S. Pat. No. 3,883,475 describes various inorganic salts such as HgO, PbO$_2$, CuO, HgCl$_2$ and AgNO$_3$ used to form addition compounds with phosphine in order to bind the phosphine formed from red phosphorus. However, these salts are toxic environmental pollutants and/or expensive and, hence, their general utility is questionable.

British Pat. No. 1,437,301 describes amidosulfonic acid and ammonium bisulfate as effective in reducing phosphine production in phosphorus containing polyolefin compositions. However, the high water solubility of these additives can lead to reduced effectiveness in certain environments.

U.S. Pat. No. 3,808,127 describes the impregnation of red phosphorus with trioxane and its use for the production of flame resistant thermoplastic compositions. The red phosphorus is impregnated with the trioxane to reduce dust, which red phosphorus produces due to the large amounts of fines present in the red phosphorus. Also, red phosphorus can readily ignite when in contact with hot surfaces, such as are found in processing machines. Such ignition constitutes a considerable fire risk. The impregnation of red phosphorus with trioxane is stated to reduce the risk of ignition. However, column 1, lines 57 to 62, of U.S. Pat. No. 3,808,127 states: "It is a special advantage of red phosphorus which has been impregnated in accordance with the invention that the impregnated trioxane, owning to its low boiling point (116° C.), can be rapidly and completely removed from the thermoplastics melt after the impregnated red phosphorus has been incorporated. The phosphorus is thus uniformly distributed in the thermoplastics melt. Moreover, the phosphorus filled thermoplastic is obtained free from the impregnant which could change its properties". Thus, the patent suggests that the trioxane is not present when the red phosphorus is exposed to conditions which could result in the formation of phosphine.

Thus, there exists a need to eliminate the formation of phosphine during the storage and handling of compositions containing elemental red phosphorus and also during the processing (thermoplastics) and curing (thermosets) of these compositions at elevated temperatures.

SUMMARY OF THE INVENTION

It has now been found that polymeric compositions containing elemental red phosphorus and an aldehyde of $\beta$-carbonyl containing ketone, or mixtures thereof, generates significantly less phosphine during storage, handling or processing of the composition.

An object of this invention is to provide a polymeric composition comprising a thermoplastic or thermoset polymer and elemental red phosphorus, in which the formation of phosphine is substantially reduced during the storage, handling, and processing of the composition.

This and other objects of the present invention are achieved by incorporating aldehydes or $\beta$-carbonyl-containing ketones or mixtures thereof into polymeric compositions containing elemental red phosphorus.

DESCRIPTION OF THE PREFERRED EMBODIMENTS

The aldehydes and $\beta$-carbonyl-containing ketones which are suitable for use in the present invention include a whole host of such compounds. The preferred aldehydes are aliphatic and aromatic aldehydes which can be illustrated by the following:

Acetaldehyde
Decyl aldehyde
2-Ethylbutyaldehyde
Anisaldehyde
Benzaldehyde
4-Biphenylcarboxaldehyde
5-Bromosalicylaldehyde
5-Bromovanillin
2-Chloro-4 dimethylaminobenzaldehyde
Glyoxal
Heptaldehyde
Glutaraldehyde
Terphthaldehyde
Hexanal
2-Methylundecanal
Mucochloric acid
Phenylglyoxal monohydrate
5-Acetoxymethyl-2-furaldehyde
5-Methylfurfural
Pyridinecarboxaldehyde
Piperonal
m-tolualdehyde
Vanillin
Salicylaldehyde
Phenylacetaldehyde
Dibromosalicylaldehyde
Dimethylaminobenzaldehyde
Helicin
Nitropiperonal Additionally, the aldehydes may be in the form of their derivatives such as acetals, hemiacetals, etc. Also, included by the term aldehyde herein are polymeric forms of aldehydes such as paraformaldehyde. Preferably, the less volatile aldehydes are used herein.

Included within the wide variety of β-carbonyl-containing ketones which can be used within the scope of this invention are β-diketones and α-keto carboxylic acids such as the following:
2-Acetyl-1,3-cyclohexanedione
2-Acetylcyclohexanone
2-Acetylcyclopentanone
2-Acetyl-1-tetralone
1,3-Cyclohexanedione
1,3-Cyclopentanedione
4-Cyclopentene-1,3-dione
Dibenzoylmethane
5,5-Dimethyl-1,3-cyclohexanedione
1,3-Indandione
2-Methyl-1,3-cyclohexanedione
2-Methyl-1,3-cyclopentanedione
2,4-Pentanedione
2,2,6,6-Tetramethyl-3,5-heptanedione
Thenonyltrifluoroacetone
Triacetylmethane
3-(Trifluoroacetyl)-d-camphor
Phenylbutane-2,4-dione
2-keto propionic acid
2-keto butyric acid The aldehydes and β-carbonyl-containing ketones are added in such amounts so as to react with any phosphine being formed. Preferably this amount ranges from about 0.01 to about 3.0 percent by weight and more preferably, from about 0.03 to about 2.0 percent by weight.

A special advantage of the aldehydes and β-carbonyl-containing ketones is that they have the effect of reducing phosphine formation even when used in the small quantities described. Other properties of the thermoplastic materials containing elemental red phosphorus are virtually unchanged. Many forms of red phosphorus have been reported and are suitable for use herein. Commercially available red phosphorus is amorphous. This red phosphorus may be unstabilized or stabilized with metal oxides such as aluminum and zinc, for example.

The elemental red phosphorus is generally used in quantities of from about 1 to about 20 weight percent which includes flame retardant quantities and preferably, from about 2 to about 10 weight percent.

The polymeric materials which may be used herein include the following:

1. Poly(alpha-olefins) such as polypropylene and polyethylene and copolymers of one or more alpha-olefins, such as ethylene or propylene, with one or more ethylenically unsaturated monomers including 4-methyl pentene-1; butene-1; octene-1; norbornene and its derivatives; (EPDM) cyclopetadiene; cyclopentene; cyclobutene; vinyl acetate; the $C_1$–$C_{12}$ alkyl acrylate and methacrylate esters; as well as blends of the homo- and copolymers of alpha-olefins with other types of thermoplastic polymers.

2. The homopolymer of methyl methacrylate, i.e. polymethyl methacrylate, as well as copolymers of methyl methacrylate with minor proportions of one or more alpha, beta-ethylenically unsaturated monomers which are polymerizable therewith including: the $C_1$–$C_8$ alkyl, cycloalkyl and bicycloalkyl esters of acrylic acid and the $C_2$–$C_8$ alkyl, cycloalkyl and bicycloalkyl esters of methacrylic acid such, for example, as ethyl acrylate and methacrylate, butyl methacrylate, ethylhexyl methacrylate, norbornyl acrylate, and cyclohexyl acrylate; vinyl aryl compounds such, for example, as alpha-methyl styrene and styrene; and, nitriles of alpha, beta-ethylenically unsaturated carboxylic acids such, for example, as acrylonitrile and methacrylonitrile. From the above given group, the use of the $C_1$–$C_{18}$ alkyl esters of acrylic acid, particularly ethyl acrylate, and of the $C_1$–$C_8$ alkyl esters of methacrylic acid is preferred.

3. Acrylonitrile-butadiene-styrene resins, commonly referred to as "ABS" resins which generally comprise either a mixture of a 60 to 80:40 to 20 styrene: acrylonitrile copolymer with from about 10 to 40%, by weight of a 5 to 40:95 to 60 acrylonitrile:butadiene copolymer or a mixture of a 60 to 80:40 to 20 styrene:acrylonitrile copolymer with from about 10 to 40%, by weight, of a graft of the latter copolymer onto polybutadiene.

4. Polystyrene and copolymers of styrene or alpha-methylstyrene with a minor proportion of one or more ethylenically unsaturated comonomers such, for example, as nitriles of ethylenically unsaturated carboxylic acids including acrylonitrile and methacrylonitrile; and $C_1$–$C_{12}$ alkyl esters of acrylic and methacrylic acid such, for example, as methyl methacrylate and 2-ethylhexyl acrylate; and graft copolymers of styrene or alpha-methylstyrene with polybutadiene and other hydrocarbon elastomers.

5. Cellulosic resins including cellulose esters and mixed esters such, for example, as cellulose nitrate, cellulose acetate, cellulose butyrate, cellulose propionate, cellulose acetate-butyrate, cellulose acetate-propionate and cellulose ethers such, for example, as ethyl cellulose.

6. Polyamide resins, i.e. the resins made by the condensation of di- or polyamines with di- or polybasic acids or by polymerization of lactams or amino acids. Typical polyamides include: nylon 4 which is made from pyrrolidone; nylon 6 obtained by polycondensation of caprolactam; nylon 66 obtained by the condensation of hexamethylene diamine with adipic acid; nylon 6,10 obtained by the condensation of hexamethylenediamine with sebacic acid; nylon 7 which is a polymer of ethyl aminoheptanoate; nylon 9 made from 9-aminononanoic acid; and nylon 11 made from 11-amino undecanoic acid.

7. Polyester resins, i.e. the resins produced by the condensation of saturated or unsaturated dibasic acids, such as terephthalic, maleic, fumaric, isophthalic, adipic and azelaic acids with dihydric alcohols such as ethylene glycol, propylene glycol, diethylene glycol and dipropylene glycol. These polyesters include poly(ethylene terephthalate) and poly(butylene terephthalate). Where the resin is made with an unsaturated acid, a polymerizable monomer such, for example, as styrene, vinyl toluene, diallyl phthalate, methyl methacrylate; chlorostyrene, alpha-methyl styrene, divinyl benzene or triallyl cyanurate is often included in the composition.

8. Polyurethane resins, i.e. the resins formed by the reaction between a bi- or polyfunctitonal hydroxyl containing compound, such as a polyether or polyester and a di- or polyisocyanate such as toluene diisocyanate or diphenylmethane-4,4'-diisocyante.

9. Polycarbonate resins, i.e. the resins derived from the reaction between a difunctional alcohol or phenol, such as bisphenol A, and phosgene or an alkyl or aryl carbonate.

10. Polyacetal resins, i.e. the resins derived from the anionic polymerization of formaldehyde to obtain a linear molecule of the type —O—CH$_2$—O—CH$_2$—O—CH$_2$— and copolymers thereof, for example with ethylene oxide.

11. Polyphenylene oxide resins mady by the oxidative polymerization of 2,6-dimethylphenol in the presence of a copperamine-complex catalyst. Also included herein are blends of polyphenylene ether and styrene resin.

12. Polysulfone resins, i.e., the resins containing an SO$_2$ linkage as derived from the reaction of sulfur dioxide with olefins such as 1-butene or, more preferably, by reaction of biphenol A with 4,4'-dichlorodiphenyl sulfone.

13. The acrylate:styrene:acrylonitrile resins, commonly referred to as "ASA" resins, which comprise a copolymer containing a major proportion of a C$_2$–C$_8$ alkyl acrylate elastomer upon which is grafted about 80–72% of the weight of the latter copolymer of a 70–80:30–20 styrene:acrylonitrile copolymer.

14. Epoxy resins produced from an active hydrogen bearing compound, such as bisphenol A, and a chlorohydrin.

15. Phenol-aralkyl resins produced by the condensation of aralkyl ethers and phenols and which are cured by, for example, heating with hexamethylene tetramine or selected epoxy compounds.

16. Phenolic resins, either one or two stage resins.

Thus, a wide variety of thermoplastic polymers as well as thermoset polymers may be used herein. These polymers may be molded or extruded into objects or formed into film.

In addition to the red phosphorus, aldehyde and β-carbonyl-containing ketones, the compositions of this invention may contain various optional additives which include: reinforcing agents such as glass and carbon fibers; fillers such as silica, talc, calcium carbonate, mineral powders, carbon black an graphite, metallic powders and asbestos; pigments such as titanium dioxide and zinc oxide; dyes; processing aids, flame retardant additives such as organohalides, organophosphorus compounds, aluminum trihydroxide, and the like. Additionally, the composition may contain additives such as paraffin oil, chloroparaffins, mineral oils, silicone oil, phosphate esters, dioctyl phthalate, etc. to prevent dusting of the elemental red phosphorus. These additives would be used in amounts designed to provide the intended effect in the resulting composition.

The composition of the present invention may be prepared by blending the polymeric material with the elemental red phosphorus and the aldehyde and/or β-carbonyl-containing ketone. Of course, the aldehyde and/or β-carbonyl-containing ketone must be allowed to remain in the composition. Blending or mixing of the components may be carried out in most any conventional equipment such as a Banbury type mixer or extruder. Additives such as fillers etc. may be added to the composition during blending or mixing. Also, if desired, the elemental red phosphorus can be impregnated with the aldehydes or ketone.

The following examples will more fully illustrate the invention.

EXAMPLE 1

To a 125 ml flask were added 3.0 grams of red phosphorus and 0.1 grams of dibenzoylmethane. The flask was stoppered and the phosphorus was allowed to react with the air in the flask at ambient temperatures for 48 hours. The phosphine level was determined using commercially available Kitagawa detector tubes attached to air flask. In this method the air inside the flask is passed through the detector tubes which contain chemicals which react with the phosphine formed to give a color change. The length of the colored band formed is proportonal to the phosphine concentration which is determined from a calibration chart supplied with the equipment. The amount of phosphine formed in parts per million (ppm) is as set forth in Table I.

EXAMPLES 2 TO 8

Example 1 was exactly repeated except that the additives used are set forth in Table I.

TABLE I

| EXAMPLE | ADDITIVE | PHOSPHINE(ppm) |
|---|---|---|
| Control[1] | — | 251 |
| 1 | dibenzoylmethane | 45 |
| 2 | acetylacetone | 148 |
| 3 | vanillin | 34 |
| 4 | terephthaladehyde | 5 |
| 5 | o-phthalicdicarboxaldehyde | 2 |
| 6 | salicylaldehyde | 62 |
| 7 | paraformaldehyde | 0 |
| 8 | β-ketopropionic acid | 9 |

[1]Indicates that no additive was present.

The data in Table I show that by using the additives of the present invention phosphine formation is reduced.

EXAMPLE 9

The procedure of Example 1 was exactly repeated except that terephthaldehyde was added in the amounts shown in Table II.

TABLE II

| Terephthaladehyde(g) | phosphine(ppm) |
|---|---|
| Control[1] | 200 |
| 0.1 | 2 |
| 0.05 | 2 |
| 0.01 | 2 |
| 0.005 | 8 |
| 0.001 | 83 |

[1]Indicates that no additive was present.

The data of Table II show that aldehyde additives are effective to reduce phosphine formation in amounts as low as 0.001 grams.

EXAMPLE 10

Commercially available poly(ethylene terphthalate) was blended with 3.0 percent by weight of red phosphorus. This composition was melt processed in an extruder at 275° to 290° C. (residence time 2 to 5 minutes). The air space above the die of the extruder was measured for phosphine formation during extrusion using a Kitagawa detector tube. 0.04 part per million (ppm) of phosphine was detected.

EXAMPLE 11

The procedure of Example 10 was exactly repeated except that 0.2 percent by weight of terephthaldehyde was added to the composition by blending. Less than 0.01 ppm of phosphine was detected at the die during extrusion of the composition.

EXAMPLE 12

Commercially available polycaprolactam was blended with 7.0 percent by weight of red phosphorus. This composition was melt processed in an extruder at 250° to 275° C. (residence time 2-5 minutes). The air space above the die of the extruder was measured for phosphine formation during extrusion as described in Example 11. 0.06 ppm of phosphine was detected.

EXAMPLE 13

The procedure of Example 12 was exactly repeated except that 0.2 percent by weight of terephthaladehyde was added to the composition by blending. Less than 0.01 ppm of phosphine was measured at the die during extrusion of the composition.

EXAMPLE 14

Polyethylene having a density of 0.96 g/cm³ and a melt index of 4.0 was blended with 8.0 percent by weight of red phosphorus in an extruder and injection molded at 200° C. into test specimens. The air space over the die during extrusion and over the mold was measured for phosphine formation as described in Example 11. 0.02 ppm of phosphine was detected.

EXAMPLE 15

The procedure of Example 14 was exactly repeated except that 0.2 percent by weight of vanillin was blended with the composition. Less than 0.01 ppm of phosphine was detected during extrusion either at the die or hopper of the extruder. Also, during injection molding, no detectable levels of phosphine were detectable over the air space of the mold.

What is claimed is:

1. A polymeric composition comprising a thermoplastic or thermoset polymer, elemental red phosphorus and an aldehyde selected from the group consisting of:
    Acetaldehyde
    Decyl aldehyde
    2-Ethylbutyaldehyde
    Anisaldehyde
    Benzaldehyde
    4-Biphenylcarboxaldehyde
    5-Bromosalicylaldehyde
    5-Bromovanillin
    2-Chloro-4 dimethylaminobenzaldehyde
    Glyoxal
    Heptaldehyde
    Glutaraldehyde
    Terephthaldehyde
    Hexanal
    2-Methylundecanal
    Mucochloric acid
    Phenylglyoxal monohydrate
    5-Acetoxymethyl-2-furaldehyde
    5-Methylfurfural
    Pyridinecarboxaldehyde
    Piperonal
    m-tolualdehyde
    Vanillin
    Salicylaldehyde
    Phenylacetaldehyde
    Dibromosalicylaldehyde
    Dimethylaminobenzaldehyde
    Helicin
    Nitropiperonal
their derivatives, their polymeric forms and mixtures thereof.

2. The composition of claim 1 wherein the red phosphorus is present in an amount which will flame retard the composition.

3. The composition of claim 1 or 2 wherein the aldehyde is present in an amount which will react with phosphine being formed.

4. A polymeric composition comprising a thermoplastic or thermoset polymer, elemental red phosphorus and a β-carbonyl-containing ketone selected from the group consisting of:
    2-Acetyl-1,3-cyclohexanedione
    2-Acetylcyclohexanone
    2-Acetylcyclopentanone
    2-Acetyl-1-tetralone
    1,3-Cyclohexanedione
    1,3-Cyclopentanedione
    4-Cyclopentene-1,3-dione
    Dibenzoylmethane
    5,5-Dimethyl-1,3-cyclohexanedione
    1,3-Indandione
    2-Methyl-1,3-cyclohexanedione
    2-Methyl-1,3-cyclopentanedione
    2,4-Pentanedione
    2,2,6,6-Tetramethyl-3,5-heptanedione
    Thenoyltrifluoroacetone
    Triacetylmethane
    3-(Trifluoroacetyl)-d-camphor
    Phenylbutane-2,4-dione
    2-keto propionic acid
    2-keto butyric acid
and mixtures thereof.

5. The composition of claim 4 wherein the red phosphorus is present in an amount which will flame retard the composition.

6. The composition of claims 4 or 5 wherein the β-carbonyl-containing ketone is present in an amount which will react with phosphine being formed.

7. A process for making a polymeric composition comprising the steps of:
    (a) blending thermoplastic or thermosetting polymer, elemental red phosphorus and an aldehyde selected from the group consisting of:
    Acetaldehyde
    Decyl aldehyde
    2-Ethylbutyaldehyde
    Anisaldehyde
    Benzaldehyde
    4-Biphenylcarboxaldehyde
    5-Bromosalicylaldehyde
    5-Bromovanillin
    2-Chloro-4 dimethylaminobenzaldehyde
    Glyoxal
    Heptaldehyde
    Glutaraldehyde
    Terephthaldehyde
    Hexanal
    2-Methylundecanal
    Mucochloric acid
    Phenylglyoxal monohydrate
    5-Acetoxymethyl-2-furaldehyde
    5-Methylfurfural
    Pyridinecarboxaldehyde
    Piperonal
    m-tolualdehyde
    Vanillin
    Salicylaldehyde
    Phenylacetaldehyde
    Dibromosalicylaldehyde
    Dimethylaminobenzaldehyde
    Helicin
    Nitropiperonal their derivatives, their polymeric forms and mixtures thereof so as to form a composition, and (b) allowing the aldehyde to remain in the composition.

8. A process for making a polymeric composition comprising the steps of:

(a) blending thermoplastic or thermosetting polymer, elemental red phosphorus and a β-carbonyl-containing ketone selected from the group consisting of:
2-Acetyl-1,3-cyclohexanedione
2-Acetylcyclohexanone
2-Acetylcyclopentanone
2-Acetyl-1-tetralone
1,3-Cyclohexanedione
1,3-Cyclopentanedione
4-Cyclopentene-1,3-dione
Dibenzoylmethane
5,5-Dimethyl-1,3-cyclohexanedione
1,3-Indandione
2-Methyl-1,3-cyclohexanedione
2-Methyl-1,3-cyclopentanedione
2,4-Pentanedione
2,2,6,6-Tetramethyl-3,5-heptanedione
Thenoyltrifluoroacetone
Triacetylmethane
3-(Trifluoroacetyl)-d-camphor
Phenylbutane-2,4-dione
2-keto propionic acid
2-keto butyric acid
and mixtures thereof so as to form a composition, and (b) allowing the β-carbonyl-containing ketone to remain in the composition.

* * * * *